March 3, 1964 R. O. HOLLOWAY ETAL 3,123,798
FISH FINDER
Filed April 29, 1960 3 Sheets-Sheet 1

INVENTORS
Rollind O. Holloway
& John R. Holloway
BY Mead, Browne, Schuyler & Beveridge
ATTORNEYS March 3, 1964  R. O. HOLLOWAY ETAL  3,123,798
FISH FINDER
Filed April 29, 1960  3 Sheets-Sheet 2
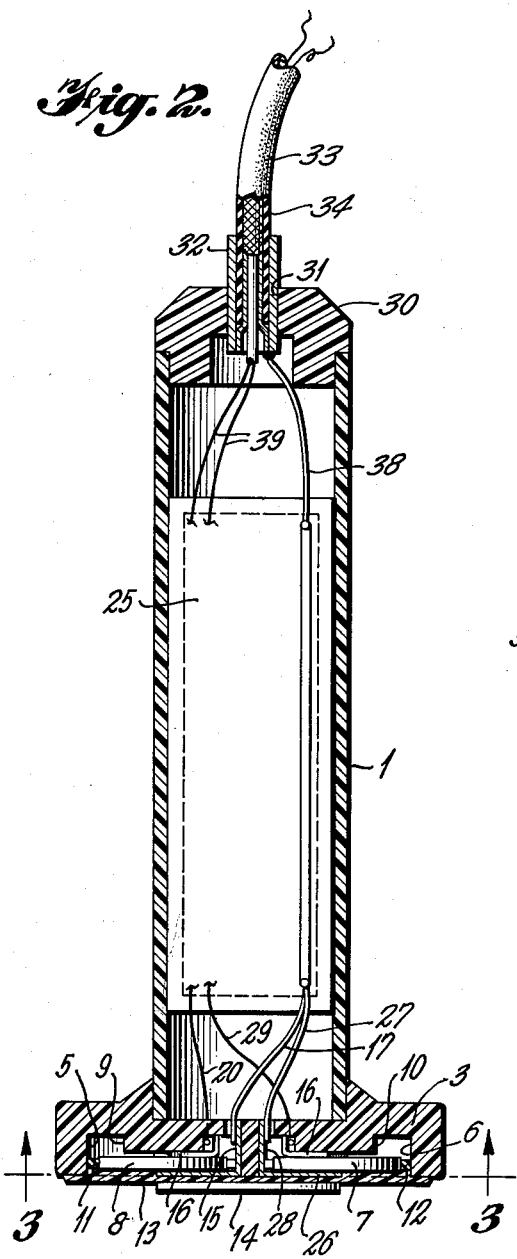
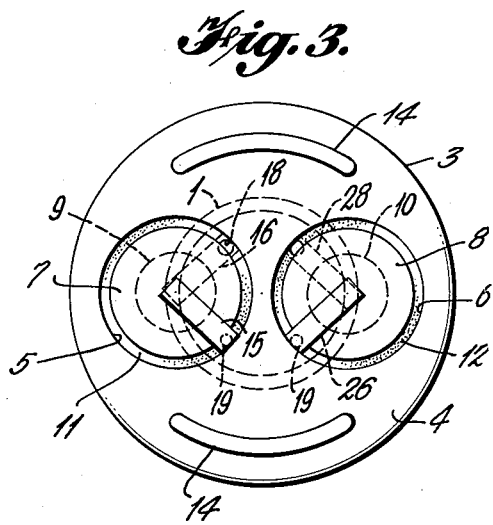
INVENTORS
Rollind O. Holloway
& John R. Holloway
BY Mead, Browne, Schuyler & Beveridge
ATTORNEYS

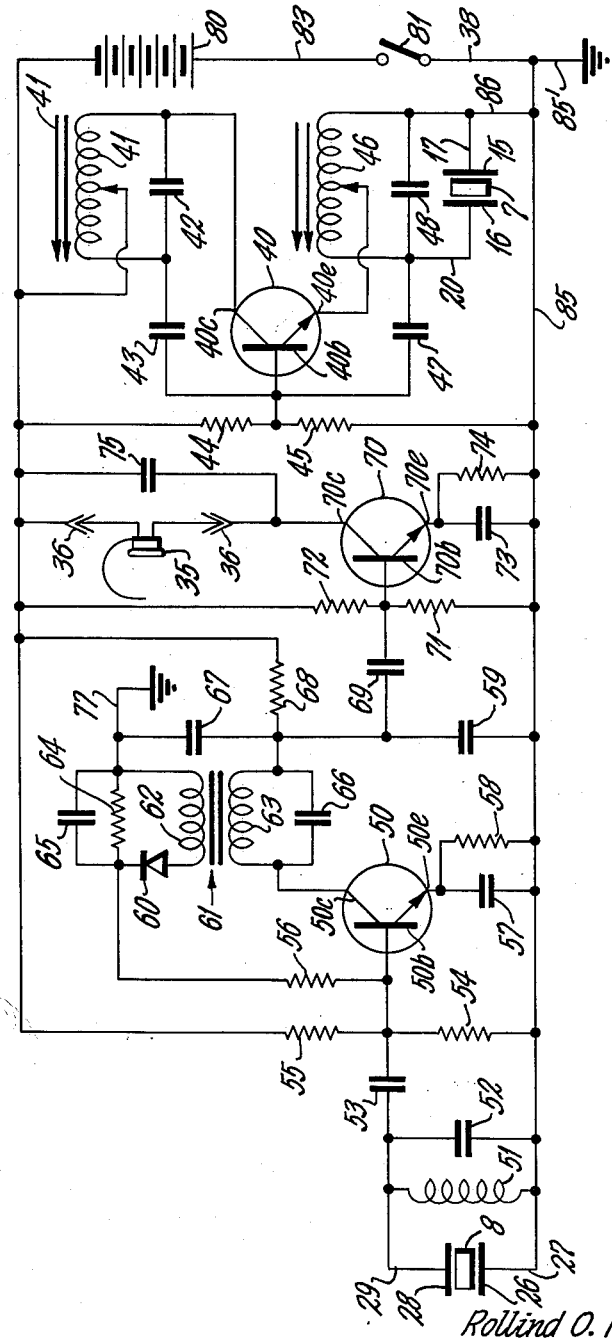

3,123,798
FISH FINDER
Rollind O. Holloway, 2019 Mayo St., and John R. Holloway, 1910 Wiley St., both of Hollywood, Fla.
Filed Apr. 29, 1960, Ser. No. 25,712
10 Claims. (Cl. 340—3)

This invention relates to a method and apparatus for detecting and locating objects submerged in water and particularly concerns a portable device for locating fish or other marine life in water.

Use of sonic, supersonic and ultrasonic wave energy to detect and locate objects in water has been extensively developed. Elaborate systems are used in naval vessels to detect and locate other vessels. Particularly when used for detection of vessels or objects beneath the surface of the water, these systems are heavy, bulky and expensive. Although some use of them has been proposed for commercial purposes such as depth finders and measuring devices for submerged objects, the use has been restricted mainly to naval-military purposes.

Systems of this type can of course be used to ascertain the presence and location of any objects submerged in the water. Different systems respond to different types of objects and many systems now in use detect the presence of fish in the vicinity. Usually this is considered a false indication for the purposes for which the systems are intended.

Sonar systems and other systems using electromagnetic or pressure wave energy for object detection and location are much too expensive to be available to the average sportsman and are usually too complex and expensive to be used by commercial fishermen who desire to ascertain the location of a fish or a school of fish. Equipment necessary for such systems is far too heavy and bulky to be used by the individual fisherman.

It is a major object of this invention to provide a small lightweight portable inexpensive device for locating fish within a practical area around the fisherman.

More particularly, an object of this invention is to provide a lightweight, compact device which is within a price that the average individual fisherman can afford and which may be used by him for the purpose of approximately locating any fish in a practical area of the water where the sportsman is fishing.

In the attainment of these objects, an important feature of the invention resides in the method of locating a fish by scanning surrounding water areas with a narrow beam of pressure wave energy emanating from a source and comparing the frequency of the transmitted pressure wave energy with the frequency of pressure wave energy reflected from objects to a point adjacent the source of the transmitted energy. The beam may be scanned horizontally to direct the pattern of the waves in different azimuthal directions. By indicating any difference in the frequency of the transmitted energy and the reflected energy the fisherman is provided with information concerning the presence of a moving fish within the beam of the transmitted energy. The frequency difference is the result of the well-known "Doppler" effect and is sufficient within a practical range to provide the fisherman with an indication of the presence and general location of the fish within the area scanned. Furthermore, the tone or pitch heard by the operator wearing an earphone detector varies with the speed of the object irrespective of whether the fish is moving toward or away from the instrument. Thus, the tone and the intensity of the response enables the operator to judge the speed, distance, and even the size of the moving fish.

It should be noted that compressional waves and eddy currents exist about a moving fish and reflect externally derived compressional waves and these reflections appear to an observer as coming from a much larger body than that of the fish itself. It is only because of this phenomenon that a lightweight portable device operated off of a small power supply is possible for locating fish. Furthermore, the compressional waves about the fish will be moving in all directions away from the fish thereby allowing detection of these waves by an instrument designed to utilize the "Doppler" effect even though the fish may be almost stationary or moving in a path equidistant from the observer.

An important feature of the invention resides in the arrangement of a portable instrument which may be immersed beneath the surface of the water and carrying a pair of transducers arranged adjacent one another with one transducer excited by an oscillator at a sonic frequency in the range between 400 and 1000 kilocycles per second and preferably of the order of 800 kilocycles per second. A second transducer adjacent the first is connected to a receiver which compares the frequency of the transmitted pressure wave energy from the first transducer with the frequency of pressure wave energy reflected from a moving object to the second transducer.

In its preferred form, an audible indication, as by earphones, is produced of any difference between the frequencies of transmitted and reflected pressure wave energy. By manually scanning the narrow beam of the transducers the fisherman when he hears a frequency difference in the ear-phones is provided with an indication of the direction in which a moving fish is located with respect to the instrument. With practice the fisherman can determine the approximate size and speed of the fish, which information can be correlated to give the probable identity of the fish.

More specifically, features of the invention reside in the arrangement of a watertight housing carrying a pair of transducers having their directional axes substantially aligned. In its preferred form, the transmitting oscillator is carried in the housing and connected through the housing to the transducer at the exterior surface of the housing so pressure wave energy at the oscillator frequency is transmitted along the beam of the transducer. A second transducer mounted adjacent the first at the exposed outer surface of the housing is likewise coupled through the wall of the housing to a receiver within the housing which compares the frequency of transmitted wave energy with the frequency of reflected wave energy and provides the operator through connection to an ear-phone, externally of the housing, with an indication of the presence of any moving fish within the beam pattern of the transducers.

To minimize interference with or from radio transmitters and receivers in the area, the common conductors for the power supply and circuitry of the oscillator and receiver are connected through the waterproof housing to an electrode on the outer surface of the housing. This electrode in effect grounds the circuits to the surrounding water to provide an effective shield around the transmitter and receiver to prevent electro-magnetic interference with or from radio transmitters and receivers in the area. Pressure wave energy is transmitted and received by the respective transducers and the operator's ear-phones provide an indication of the presence of moving objects within the range of the instrument.

These and other objects, advantages and features of the invention will become apparent in the following specification taken in conjunction with the accompanying drawings, wherein:

FIG. 2 is a longitudinal sectional view of the preferred form of the major component of the apparatus showing particularly the transducers used for transmitting and receiving pressure waves;

FIG. 3 is a sectional view taken along a plane indicated by line 3—3 of FIG. 2; and FIG. 4 is a schematic drawing of the transistor circuit employed in the invention.

Figure 1:
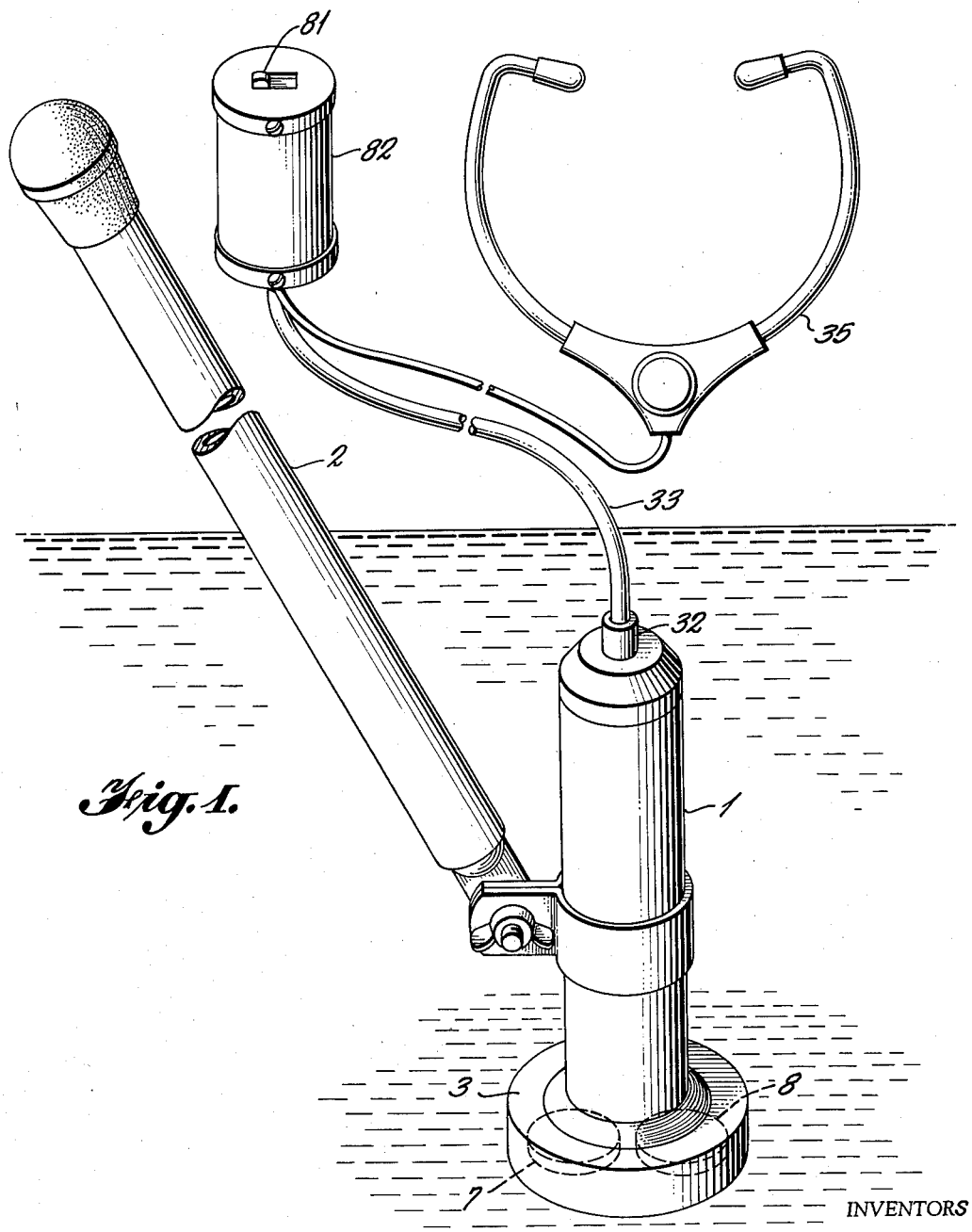
FIG. 1 is a perspective view of apparatus employing the invention.

As shown in the drawings, cylindrical housing 1 has a suitable handle 2 to support the device for immersion beneath the surface of the water. Headpiece 3, which closes one end of the housing 1 has its face 4 oriented perpendicularly to the longitudinal axis of housing 1. Cylindrical recesses 5 and 6 formed in headpiece 3 extend inwardly from face 4 to receive piezoelectric transducer discs 7 and 8 respectively disposed on projections 9 and 10 extending from the bottom walls of recesses 5 and 6. The projections 9 and 10 support the transducer discs 7 and 8 with the axes of the discs substantially parallel to the longitudinal axis of housing 1. Annular resilient bushings 11 and 12 surround discs 7 and 8 and maintain the discs in spaced relation to engage the side walls of recesses 5 and 6. Transducer discs 7 and 8 are retained with the recesses by pliable sealing material 13 filling the outer end portions of the respective recesses 5 and 6.

To drive transducer disc 7 an electrical contact 15 engages the outer face of the disc 7 and an electrical contact 16 engages the inner face of the disc. Contact 15 is connected by conductor 17 which enters the interior of the housing 1 through port 19 to connect to a common ground and contact 16 is connected to conductor 20 which enters the interior of the housing through port 18 for connection to the output of a transmitting circuit mounted on a circuit board 25 supported within the interior of the housing 1.

Receiving transducer disc 8 has its outer face engaged by an electrical contact 26 connected by a wire 27 extending to the interior of the housing 1 and connected to the same common ground as conductor 17. Engaging the inner face of receiving transducer 8 is a contact 28 connected by a conductor 29 to the input of a receiving circuit mounted on circuit board 25.

Closing the end of cylindrical housing 1 opposite the headpiece 3, is a sealing cap 30 having a port 31 in which is mounted a tubular grounding electrode 32 through which extends cable 33 leading from the transmitting and receiving circuits on board 25 to battery container 82 and ear-phones 35. Grounding electrode 32 is connected within housing 1 to the common ground of the circuits by conductor 38 and to the shielding wire mesh 34 of cable 33 which is connected through switch 81 to the positive pole of battery 80 within battery container 82. Conductor leads 39 which form the core of cable 33 connect ear-phones 35 to the receiving circuit.

As shown schematically in FIG. 4, the combined transmitting and receiving circuit has a single source of power in the form of battery 80 and a common conductor 85 grounded at 85′. In this circuit, the transmitter includes a single transistor 40 connected in an oscillator circuit for driving transmitting transducer 7 at the desired transmitting frequency, at a frequency between 400 and 1,000 kilocycles per second and preferably at a frequency of approximately 800 kilocycles per second. Transistor 40 has its base 40b biased at a forward conducting potential by resistors 44 and 45 which serve as a voltage divider across the battery 80. Collector 40c of transistor 40 is connected through a parallel tune circuit comprising condenser 42 and slug tune coil 41 to the positive side of the battery 80 the negative side of which is connected by a lead 83 to the battery switch 81 and ground. Emitter 40e is connected to the midpoint of a slug tune coil 46 which is parallel tuned by condenser 48. One end of the parallel tuned emitter circuit is connected by a lead 86 to the common grounded conductor 85. Feedback condensers 43 and 47 are respectively connected between the collector and emitter tune circuits to the base 40b of the transistor 40. Transmitting transducer 7 has its electrodes 15 and 16 connected by leads 17 and 20 across the parallel tuned emitter circuit to cause the piezoelectric transducer 7 to oscillate at the desired frequency.

In the receiving circuit, receiving transducer 8 has its electrodes 26 and 28 connected respectively by leads 27 and 29 across the terminals of a parallel tune circuit comprising coil 51 and condenser 52 having a resonant frequency approximately corresponding to the transmitting frequency of transmitting transducer 7 and the oscillator of transistor 40. Oscillations of receiving transducer 8 caused by pressure waves reflected from objects in the water, will, by the piezoelectric effect, develop potentials at electrodes 26 and 28 at approximately the frequency of the reflected wave and cause the circuit of coil 51 and condenser 52 to oscillate. This oscillating potential is applied to base 50b of transistor 50 which has its electrodes connected to serve the function of a radio frequency amplifier and detector as well as an audio-frequency amplifier. Base 50b of transistor 50 is biased by resistors 54 and 55 which serve as a voltage divider across the battery 80. Oscillating potentials of the frequency of the reflected pressure wave are thus applied to base 50b of the transistor 50 having its collector 50c connected through a tune circuit comprising the primary winding 63 of transformer 61 and parallel condenser 66 as well as resistor 68 to the positive side of the battery 80. The tuned circuit comprising the primary winding 63 and condenser 66 has a resonant frequency approximating the frequency of transmitting transducer 7 so the amplified oscillating potential of the receiving transducer 8 excites secondary winding 62 of the transformer 61 which is connected through diode rectifier 60 and resistor 56 to the base 50b. Completing the reflex circuit in the secondary winding of the transformer 61 is a resistor 64 connected in series with the rectifier 60 and the secondary winding 62 having one end grounded at 77. Resistor 64 is shunted by a condenser 65. On the circuit board 25, transformer 61 is so positioned with respect to either or both of the slug tune coils 41 and 46 that the windings 62 and 63 are inductively coupled to at least one of the coils so potentials at the frequency transmitting transducer 7 are induced in the windings 63 and 62 of the transformer 61. Thus, secondary winding 62 is excited with potentials corresponding to the frequency of the transmitting transducer 7 as well as the frequency of the reflected pressure wave which excites receiving transducer 8. The result of the two alternating potentials of different frequencies in the circuit of secondary winding 62 is a wave which varies in amplitude at a frequency corresponding to the difference between the frequency of the transmitted pressure wave and the frequency of the received or reflected pressure wave. This beat frequency, which is in the audible range, is demodulated by diode 60 and applied through resistor 56 to the base 50b of the transistor 50. Any high frequency oscillations appearing across resistor 64 are by-passed by condenser 65 to ground. Emitter 50e of transistor 50 is biased by resistor 58 at a desired potential above the common grounded conductor 85 and resistor 58 is by-passed by condenser 57 to by-pass any high frequency potential which may appear across resistor 58.

The detected audio signal applied by resistor 56 to base 50b of transistor 50 is amplified by the transistor and appears at the output of the collector circuit as a varying potential drop across collector resistor 63. Any high frequency potential at this point is by-passed by condensers 59 and 67 to ground and the amplified audio signal is applied through condenser 69 to base 70b of amplifying transistor 70. Base 70b is connected between resistors 71 and 72 forming a voltage divider across the battery 80. Emitter 70e of transistor 70 is biased above ground potential by resistor 74 which is by-passed by a condenser 63. Operating potential for collector 70c of transistor 70 is supplied through ear-phone 35 when plugged in through jacks 36, 36 to complete the circuit from the positive side of battery 80. To protect the ear-phone 35 from any RF potential a condenser 75 is connected across the jacks 36, 36.

The piezoelectric tranducers are preferably of barium titanate approximately one inch in diameter and one-eighth of an inch thick. Such discs will generate a conical beam of an angular width of approximately 4° although a wider beam may be used. The use of this 4° beam excludes detection of movements except in the desired area and enables the observer to follow the movements of a single fish. For this reason, proper alignment and relatively close spacing of the transducers with respect to each other is necessary to obtain the desired results. In this circuit battery 80 is a nine volt battery.

Operation of the Fish Finder is initiated by plugging in ear-phone 35 through jacks 36, 36 and closing battery switch 81. The circuit of transmitting transducer 40 will then oscillate and drive transmitting transducer 7 at a frequency between 400 kilocycles per second and 1,000 kilocycles per second. The frequency of the order of 800 kilocycles per second has been found particularly desirable. Pressure waves developed by oscillation of transmitting transducer 7 when being directed toward an object such as a fish moving in the water will cause reflected pressure waves of a frequency differing slightly from that of the transmitting transducer 7. Whether the reflected frequency is higher or lower will depend upon whether the object is coming toward or moving away from the instrument. Reflected pressure waves cause vibrations of piezoelectric receiving transducer 8 which are amplified by transistor 50 and beat with potentials of the transmitted frequency induced from coils 41 or 46 in the windings of transformer 61. These interfering potentials of slightly different frequencies produce an amplitude modulation the envelope of which is detected by diode 60 and applied in a regenerative circuit through transistor 50 to amplify the audio signal which is again supplied through transistor 70 and amplified so it may be heard by the operator using ear-phone 35. It will be appreciated that the frequency difference and hence the tone or pitch heard by the operator is the same for a given speed whether the object is moving toward or away from the instrument.

When the transmitting transducer is excited at a frequency of the order of 800 kilocycles per second, the receiving circuit is sufficiently sensitive to detect objects moving at a speed of the order of one mile per hour toward or away from the instrument. Since fish normally travel at speeds considerably exceeding this velocity, it is possible to detect even small fish swimming at high speed within a limited range. Fish of the order of six to eight inches long have been detected over a range exceeding 500 feet from the instrument.

While I have disclosed but one embodiment of my invention, it will be apparent to those skilled in the art that various changes and modifications may be made therein without departing from the scope of the invention.

In the claims:

1. In an instrument for locating objects beneath the surface of the water wherein pressure waves of ultrasonic frequencies are transmitted and received by the instrument, the improvement which comprises a transducer mounting on apparatus for immersion beneath the surface of the water comprising a body of insulating material, said body being formed with a cylindrical recess extending from an outer surface to a recess bottom, a piezoelectric transducer disc disposed within said recess, an annular resilient ring surrounding said disc and engaging the side walls of said recess, conductor contacts extending through the bottom wall of said body and respectively engaged with the surfaces of said disc, and pliable cover across the said recess at said outer surface sealing said transducer within said recess and affording transmission of pressure waves between said transducer and a liquid medium in which said body is immersed.

2. An apparatus for locating objects moving beneath the surface of the water, a portable instrument for immersion beneath the surface of the water to transmit pressure waves to the water and receive pressure waves reflected from objects in the water comprising a body of insulating material and a pair of recesses formed in said body and extending from an outer surface thereof, a pair of directional transducers disposed within said recesses so that the directional axes of said pair of directional transducers are substantially parallel to each other and normal to said outer surface, sealing means covering the openings of said recesses at said outer surface and sufficiently pliable to transmit pressure waves between the water in which said instrument is immersed and said transducers, electrodes engaging the opposite surfaces of said transducers and connected to conductors extending through the bottom walls of said recesses respectively connected to transmitter and receiving devices and said pair of transducers being so arranged and connected to said conductors that one of said transducers is electrically excited to vibrate mechanically and the other transducer is mechanically excited by reflected pressure waves to generate an electrical potential independent of the electrical excitation of said one transducer.

3. In apparatus for locating objects moving beneath the surface of the water a portable instrument for immersion in water to transmit pressure waves and receive pressure waves reflected from objects in the water comprising a body of insulating material having an outer surface for exposure to the water, a first cylindrical recess formed in said body and extending from said outer surface to a bottom wall, a projection extending from said bottom wall toward said outer surface in the central portion of said recess and spaced from the side walls of said recess, a piezoelectric disc disposed on said projection with its faces substantially parallel to said outer surface so that the directional axis of said disc is coaxial with said recess and in a direction normal to said outer surface, an ultrasonic oscillator conductor means engaging respectively the faces of said piezoelectric disc and extending through said bottom wall for connection to said oscillator for driving said disc at a relatively fixed ultrasonic frequency, sealing means forming a watertight cover at the open end of said recess and pliable to transmit vibrations from said transducer to cause pressure waves to emanate from said instrument in a beam along the direction of the axis of said disc, a second cylindrical recess formed in said body adjacent said first recess and extending from said outer surface to a bottom wall, a projection in the bottom of said second recess extending from said bottom wall and spaced from the side walls thereof, a second piezoelectric disc disposed in said second recess on said projection with its faces substantially parallel to the outer surface of said body so that the directional axis thereof is parallel of the directional axis of said first disc and extends in a direction normal to said surface, receiving means, conductor means connected and extending from the respective faces of said disc through the bottom wall of said second recess to said receiving means, means for comparing the frequency of waves transmitted by said first piezoelectric transducer with the frequency of waves reflected from objects in the water in which the instrument is immersed, pliable sealing means covering the opening of said second recess at said outer surface of the body forming a watertight compartment within said recess and transmitting pressure waves between the water in which the instrument is immersed and the piezoelectric transducer within the second recess.

4. In apparatus for locating objects moving beneath the surface of the water a portable instrument as defined in claim 3 including a resilient annulus between the peripheries of the respective discs and the inner walls of the respective recesses.

5. A portable instrument for immersion beneath the surface of the water to detect the presence and location of fish and other marine life in the water comprising a watertight housing of insulating material having a head at one end, said head being formed with a pair of recesses extending from the outer surface to a bottom wall, piezoelectric transducers disposed within said recesses, pliable sealing material closing the openings of said recesses to form watertight compartments containing said transducers, conductors extending from the opposite faces of each of said piezoelectric transducers through the bottom walls of the respective recesses and into said housing, an oscillator connected to the conductors from one of said transducers for vibrating said one transducer at a relatively constant ultrasonic frequency to cause pressure waves to emanate from the sealing material enclosing the recess of said one transducer, receiving means within said housing connected to the conductors from the other of said transducers to be actuated by pressure waves in the water and for comparing the frequency of pressure waves transmitted by said first transducer with the frequency of pressure waves reflected from moving objects and pressure waves generated by movement of said objects in the water, a common conductor for said oscillator and said receiving means, an electrode on the exterior of said housing connected to said common conductor to contact the water and form an effective shield around the instrument, and an external transducer means connected by a cable to said receiving means for providing an audible indication of any difference between the frequency of pressure waves transmitted by said one transducer and the frequency of pressure waves reflected by moving objects and pressure waves generated by movement of said objects in the water and detected by said other transducer.

6. A method for detecting the presence of fish and other moving objects submerged in water which comprises transmitting continuous constant frequency pressure waves in a directional pattern from a source beneath the surface of the water, scanning the directional pattern in azimuth, receiving at a point adjacent said source the pressure waves reflected from the interaction between the transmitted constant frequency pressure waves and radiated pressure waves induced by the moving object, and providing an indication of any difference between the frequencies of the received reflections and the transmitted pressure waves to reveal the presence of a moving object in the direction of the pattern at the time of the indication of the difference in said frequencies.

7. A method for determining the location of moving objects submerged in water comprising the steps of transmitting uninterrupted constant frequency pressure waves in a directional pattern from a substantially stationary source beneath the water, said source having a frequency of sufficient magnitude that the change in frequency between the transmitted pressure wave and the reflected pressure waves lie within the audible range, receiving reflections from areas of acoustical discontinuity in the water as generated by movement of the object, determining the bearing of the object by the directional orientation of said directional pattern.

8. A method of locating and tracking a living animal swimming in the water comprising the steps of
  transmitting a narrow beam of fixed frequency ultrasonic pressure waves from a substantially stationary position,
  receiving pressure waves, at said substantially stationary position, from the interaction of the transmitted pressure waves and the pressure waves generated by swimming movements and movement of the animal in the water,
  and causing said narrow beam to maintain its interaction with the pressure waves generated by swimming movements and movement of the living animal in the water.

9. In a Doppler system for locating fish moving beneath the surface of the water, a portable instrument for immersion in water to transmit pressure waves and receive pressure waves reflected from fish moving in the water and waves generated by the movement of the fish in the water, comprising, a body member having an outer surface for exposure to the water, and a first cylindrical recess formed in said body member and extending from said outer surface to a bottom wall, a projection extending from said bottom wall toward said outer surface in the central portion of said recess and spaced from the side walls of said recess, a piezoelectric disc disposed on said projection, with its faces substantially parallel to said outer surface so that the directional axis of said disc is coaxial with said recess and in a direction normal to said outer surface, an ultrasonic oscillator oscillating at a substantially fixed frequency lying in the range of 400 to 1000 kilocycles per second, conductor means engaging respectively the parallel faces of said piezoelectric disc and extending through said bottom wall for connection to said oscillator for driving said disc at the fixed ultrasonic frequency of said oscillator, pliable sealing means forming a watertight cover at the opening of said recess to transmit mechanical vibrations from said transducer to cause pressure waves to emanate from said instrument in a beam along the direction of the axis of said recess normal to the outer face of said disc, a second cylindrical recess formed in said body adjacent said first recess and extending from said outer surface to a second bottom wall, a second projection in the bottom of said second recess extending from said second bottom wall and centrally spaced from the side walls thereof, a second piezoelectric disc identical to said first piezoelectric disc disposed in said second recess on said second projection with its faces substantially parallel to the outer surface of said body so that its axis lies in a direction normal to said outer surface, pliable sealing means covering the opening of said second recess at said outer surface of the body forming a water-tight compartment within said second recess and transmitting pressure waves from water in which the instrument is immersed to second piezoelectric transducer within the second recess to vibrate said second piezoelectric transducer at the frequency of the reflected pressure waves, receiving means including an electrical amplifier, conductor means extending from the respective faces of said piezoelectric disc through the bottom wall of said second recess and connected to the amplifier of said receiving means, means for comparing the frequency of waves transmitted by said first piezoelectric transducer with the frequency of waves reflected from objects moving in the water and pressure waves generated by movements of the objects in the water at the output of said amplifier, and an external transducer means coupled to said comparing means for audibly reproducing the difference frequency between the transmitted pressure wave and the reflected pressure wave.

10. An apparatus for locating objects moving beneath the surface of the water as defined in claim 9 further including resilient rings between the peripheries of the respective discs and the cylindrical walls of said cylindrical recesses so that movement of said discs along the axes thereof and in the direction of said pliable sealing means is unrestrained.

References Cited in the file of this patent
UNITED STATES PATENTS

| | | |
|---|---|---|
| 1,471,547 | Chilowsky et al. | Oct. 23, 1923 |
| 2,560,066 | Batchelder | July 10, 1951 |
| 2,621,243 | Sunstein | Dec. 9, 1952 |
| 2,741,754 | Miller | Apr. 10, 1956 |
| 2,770,795 | Peterson | Nov. 13, 1956 |
| 2,791,756 | Wood et al. | May 7, 1957 |

(Other references on following page)

UNITED STATES PATENTS

| | | |
|---|---|---|
| 2,826,753 | Chapin | Mar. 11, 1958 |
| 2,837,727 | Mayes | June 3, 1958 |
| 2,896,162 | Berger et al. | July 21, 1959 |
| 2,906,991 | Camp | Sept. 29, 1959 |
| 2,912,671 | Hayes | Nov. 10, 1959 |
| 2,922,140 | Levine et al. | Jan. 19, 1960 |
| 2,935,728 | Morgan | May 3, 1960 |
| 2,961,869 | Bagno | Nov. 29, 1960 |
| 2,967,957 | Massa | Jan. 10, 1961 |
| 3,024,755 | Brooks | Mar. 13, 1962 |

FOREIGN PATENTS

| | | |
|---|---|---|
| 712,526 | Great Britain | July 28, 1954 |
| 510,278 | Canada | Feb. 22, 1955 |

OTHER REFERENCES

"Transistorized Fish Finder," Electronics World, by Mitchell, August 1959 (pp. 42–44, 108, 110 relied on).

"Portable Depth Finder for Small Boats," Electronics, by Single, February 5, 1960, vol. 33, No. 6 (pp. 50 and 51 relied on).